United States Patent [19]

Dunmead et al.

[11] Patent Number: 5,380,688

[45] Date of Patent: Jan. 10, 1995

[54] METHOD FOR MAKING SUBMICROMETER CARBIDES, SUBMICROMETER SOLID SOLUTION CARBIDES, AND THE MATERIAL RESULTING THEREFROM

[75] Inventors: Stephen D. Dunmead; William G. Moore; Alan W. Weimer; Glenn A. Eisman; John P. Henley, all of Midland, Mich.

[73] Assignee: The Dow Chemical Company, Midland, Mich.

[21] Appl. No.: 104,511

[22] Filed: Aug. 9, 1993

[51] Int. Cl.[6] ............................................. C04B 35/56
[52] U.S. Cl. .......................................... 501/87; 51/309; 423/440; 501/93
[58] Field of Search .................... 51/293, 309; 501/87, 501/93; 423/440

[56] References Cited

U.S. PATENT DOCUMENTS

| | | | |
|---|---|---|---|
| 1,610,061 | 12/1926 | Lohmann | 501/87 |
| 3,713,865 | 1/1973 | Leeds | 106/43 |
| 3,802,847 | 4/1974 | Hara et al. | 423/440 |
| 3,932,594 | 1/1976 | Gortsema | 423/440 |
| 4,008,090 | 2/1977 | Miyake et al. | 106/43 |
| 4,216,009 | 8/1980 | Miyake et al. | 423/440 |
| 4,256,496 | 3/1981 | Brandstatter | 106/43 |
| 4,454,105 | 6/1984 | Wada et al. | 423/440 |
| 4,460,697 | 7/1984 | Hara et al. | 501/87 |
| 4,664,899 | 5/1987 | Kimmel et al. | 423/440 |
| 4,752,456 | 6/1988 | Yoda et al. | 423/440 |
| 4,891,341 | 1/1990 | Cutler et al. | 501/89 |
| 4,921,531 | 5/1990 | Nagle et al. | 423/440 |
| 4,983,354 | 1/1991 | Reeder et al. | 419/11 |
| 5,126,121 | 6/1992 | Weimer et al. | 423/412 |

OTHER PUBLICATIONS

Weimer et al., "Kinetics of Carbothermal Reduction Synthesis of Boron Carbide", Journal of the American Ceramic Society, vol. 75, No. 9, Sep. 1992.

Weimer et al., "Kinetics of Carbothermal Reduction Synthesis of Beta Silicon Carbide", Aiche Journal, vol. 39, No. 3, Mar. 1993.

Primary Examiner—Mark L. Bell
Assistant Examiner—Deborah Jones
Attorney, Agent, or Firm—Dan R. Howard

[57] ABSTRACT

A method for making submicrometer metallic carbides and submicrometer solid solution metallic carbides from sources of at least one metallic oxide and carbon involves the rapid heating of a reactive particulate mixture of at least one metallic oxide and carbon in order to achieve a resulting particulate size of less than 1 micrometer. Submicrometer sized metallic carbides and solid solution metallic carbides have found great use in commercial ceramic applications. It has been found that the smaller sized particles produce a product having superior toughness and hardness. In addition, the submicrometer sized solid solution metallic carbide resulting from this method is also disclosed.

23 Claims, No Drawings

METHOD FOR MAKING SUBMICROMETER CARBIDES, SUBMICROMETER SOLID SOLUTION CARBIDES, AND THE MATERIAL RESULTING THEREFROM

TECHNICAL FIELD

This invention relates generally to methods for making metallic carbides, or solid solution carbides of two or more metals, and more particularly to rapid heating methods of making such carbides from one or more metallic oxide sources, as well as the resulting submicrometer metallic carbides and submicrometer solid solution metallic carbide compositions.

BACKGROUND OF THE INVENTION

Ceramic materials have long been known for their good chemical stability and corrosion resistance. Of the ceramic materials, metallic carbide powders are used to form dies, cutting tools, wear resistant parts and electrical resistors, as well as being used as abrasives in liquids for polishing. For example, cemented tungsten carbides are useful in forming tools and abrasives for machining and grinding of rock, porcelain, glass and metals. Large grain size carbides are acceptable for many grinding applications. However, newer technology requires improved hardness, toughness or both that is produced only by submicrometer metallic carbides or submicrometer solid solution metallic carbides. Traditional production of submicrometer particles is capital intensive and incorporates long grinding or milling times.

Prior methods generally have related to the use of free metals which were carburized in order to produce the metallic carbides. Frequently, metallic oxides, which are naturally occurring, were ground to a very small size, chemically reduced to produce their corresponding free metals, and then carburized to produce the metallic carbides. However, a substantial drawback to using free metals is that it is difficult to make submicrometer free metal particles. Once such particles are made, they are pyrophoric and difficult to handle.

One solution presently offered to this drawback is the use of solid solution carbides, also known as mixed metal carbides, in place of the pure metallic carbides. A solid solution metallic carbide is a carbide that contains an alloy or mixture of two or more metals in a single carbide. Sources used in preparing a solid solution metallic carbide include combinations of individual metallic oxides and alloys of various metals in their oxidative form. For example, tungsten carbide is a much needed ceramic. However, tungsten is a very expensive metal. By replacing part of the tungsten in a tungsten carbide with a cheaper metal such as titanium, a less expensive substitute with similar physical properties can be achieved. Such a product may include a solid solution carbide that has lower cost and weight, yet exhibits improved wear, abrasion and impact resistance. Titanium is a good substitute in tungsten carbide because not only is titanium dioxide ($TiO_2$) less dense than tungsten trioxide ($WO_3$), a common starting material for the tungsten carbide, but $TiO_2$ costs about 1/6 as much as $WO_3$ at currently published prices.

Physical properties of ceramic articles that incorporate a metallic carbide or a solid solution carbide depend to a great extent upon the grain size of the carbide powder employed. In some applications, carbide powders with very fine grain sizes are quite useful. Such carbides, having mean particle sizes of no more than 1 micrometer and especially from 0.4 to 0.8 micrometer ($\mu m$), are known as submicrometer or micrograin carbides. Submicrometer tungsten carbides, for example, are especially useful for various purposes that include fabricating tools or parts for end milling and circuit board drilling applications, and use as reinforcing materials in ceramic metal composites. In addition, the submicrometer particle size carbides have been suggested as being useful in catalytic processes. Furthermore, it is especially preferred that submicrometer carbide particles have a controlled morphology, a narrow size distribution, a well-defined stoichiometry, and are relatively high in purity.

While a variety of processes for preparing these metallic carbide powders are known, many achieve particle sizes well above submicrometer size, especially with regards to the solid solution carbides. The same hardness and resistance to wear for which metallic carbide powders are especially valued also makes their mechanical reduction to smaller sizes by conventional methods, such as grinding or milling, difficult and costly. Accordingly, it is especially desirable that carbide powders be manufactured with a small initial size, rather than attempting to reduce the particle size after the powders have been formed.

One additional drawback related to known technology of making transition metal carbide powders in general, and WC in particular, is related to their use in the manufacture of cemented carbides (e.g., WC-Co). It is well established that grain growth occurs when pure WC is liquid phase sintered with Co to make a cemented carbide. This becomes a problem when an application such as end milling or circuit board drilling requires a very small particle size in the final densified part. One method of dealing with this problem is the use of second carbide phase(s) such as vanadium carbide (VC), titanium carbide (TIC), trichromium dicarbide ($Cr_3C_2$) and tantalum carbide (TaC) that act(s) as a grain growth inhibitor during liquid phase sintering. When the particle size of a primary carbide, such as WC becomes very small, however, it becomes extremely difficult to get an intimate and homogeneous distribution of the second (or grain growth inhibiting) carbide phase(s). In view of this problem, it would be very desirable to provide a method by which a novel ultrafine carbide material with an intimate distribution of at least one grain growth inhibiting carbide phase could be produced. It would be even more desirable if the grain growth inhibiting carbide phase(s) could be made in situ during synthesis of the material and if the distribution of said grain growth inhibiting carbide phase(s) was on a size scale less than or equal to the primary carbide phase. It is contemplated that this desirable distribution would include, but not be limited to, atomic scale distribution in the form of a solid solution.

In view of the above-mentioned drawbacks and problems, it would be very desirable to have a method for making submicrometer metallic carbides and submicrometer solid solution metallic carbides more efficiently, and less expensively, than previously known.

SUMMARY OF THE INVENTION

In accordance with the preferred embodiments of the invention, these and other advantages are addressed as follows. The present invention provides an economical, rapid and efficient method for making submicrometer metallic carbides or submicrometer solid solution metallic carbides. These materials are obtained directly by carbothermal reduction of the metallic oxides of the appropriate metals into a desired submicrometer metallic carbide or solid solution metallic carbide by very rapid heating, on the order of between about 100K per second to 100,000,000K per second. It is especially useful to rapidly cool the resulting product as quickly as it was heated. This controls the morphology and the particle size of the metallic carbide powders. In addition, in practicing the present invention, some high purity metallic carbide products may be produced by a two-step process. In step one, the metallic oxide undergoes a rapid carbothermal reduction to form a carbide precursor. In step two, additional carbon is added to the precursor to form a mixture which then undergoes a second heat treatment (generally in the presence of hydrogen) to convert the precursor into a substantially pure carbide. The two-step process is not needed in all cases, but may be used when necessary.

The present invention is directed to a method for making submicrometer metallic carbide from a reactive particulate mixture of at least one metallic oxide selected from the group consisting of the oxides of Group IVB (Ti, Zr, Hf), Group VB (V, Nb, Ta), and Group VIB (Cr, Mo, W) transition metals in combination with a source of carbon by rapidly carbothermally reducing the reactive particulate mixture by heating at a rate of between about 100K per second to about 100,000,000K per second in a substantially non-oxidizing atmosphere to an elevated temperature that makes carbothermal reduction of the reactive particulate mixture thermodynamically favorable. For example, a temperature of from about 1500K to about 2600K is quite suitable for synthesis of WC. The particulate mixture is held at the elevated temperature for a residence time that is sufficient to substantially convert the reactive particulate mixture into at least one product selected from the group consisting of (i) one or more metallic carbides, (ii) one or more metallic carbide precursors, (iii) one or more solid solution carbides; and (iv) one or more solid solution carbide precursors, and combinations thereof. Preferably, the materials are cooled at a similar rate.

There are two preferred methods for rapidly heating the particulate mixture of metallic oxide(s) and carbon. In one method, also known as the "drop" method, the particulate mixture is dropped into an already heated crucible that can heat the particulate mixture at a rate of between about 100K per second to about 10,000K per second. In a second method, also known as the "entrainment method", the particulate mixture is entrained in a non-oxidizing atmosphere into a vertical reaction tube furnace maintained at the reaction temperature as described in commonly owned U.S. Pat. No. 5,110,565, the relevant teachings of which are incorporated herein by reference. The heating rate in the second method is from about 10,000K per second to about 100,000,000K per second. Heating rate determination is discussed by A. W. Weimer et al. in "Kinetics of Carbothermal Reduction Synthesis of Beta Silicon Carbide", AIChE Journal, Vol. 39, No. 3 (March 1993) at pages 493–503. It is believed that heating rates approach 100,000,000K per second with increasingly small reactant mixture particle sizes. Cooling desirably occurs at the same rate.

In the entrainment method, the mixture has an average residence time in the vertical reaction tube furnace of from about 0.2 second to 1 minute, preferably about 0.2 to 10 seconds, but may be from 0.1 seconds all the way up to 1 minute. In the drop method, the heating rate is slower than in the second method. Typical average residence times in the drop method are on the order of minutes to hours, rather than seconds, as is the case in the entrainment method. Although these two particular heating methods have been tested and proven, any rapid heating method may be used to produce suitable submicrometer metallic carbides and submicrometer solid solution metallic carbides so long as the rapidity of the heating is maintained.

When practicing the two-step process, one can readily use the entrainment method in step one and the drop method in step two. A preferred alternative to the drop method for step two is to use a rotary furnace to provide sufficient heating and residence time to produce the substantially pure carbide.

Furthermore, the present invention also includes submicrometer solid solution metallic carbides selected from the group consisting of tungsten-molybdenum carbide, tungsten-titanium carbide, molybdenum-tantalum carbide, titanium-tantalum carbide, tungsten-titanium-tantalum carbide, hafnium-tantalum carbide, titanium-hafnium carbide, tantalum-tungsten carbide and titanium-tantalum-hafnium carbide. From a cost perspective, it may be desirable to substitute chromium for a portion of one of the metals in these solid solution metallic carbides.

DETAILED DESCRIPTION OF THE INVENTION

The present invention is directed to methods for preparing submicrometer metallic carbides or submicrometer solid solution metallic carbides. The production of the monometallic carbides is discussed first. Reactant powder mixtures may generally be prepared by mixing and milling metal oxides and carbon black, and thereafter passing it through a coarse 8 mesh (U.S. Series or 2.36 millimeter (mm) opening) screen to remove the milling media. Aliquots of these mixtures are converted to metal carbides by the entrainment method, the drop method or, if desired, a combination of the two methods. The drop method involves the use of an induction furnace brought to the desired reaction temperature, as described further hereinbelow, and allowed to equilibrate for 30 minutes under a flowing non-oxidizing gaseous atmosphere such as that provided by argon. Aliquots of a reactant powder mixture are dropped into a graphite crucible in the hot zone of the furnace. The extent of the reaction is monitored by measuring the reactant by-product carbon monoxide (CO) level in the crucible as a function of time. When the CO level decreases back to its baseline value, it is assumed that the reaction is over.

It has been determined that the rates of heating in this drop method are from about 100K per second to about 10,000K per second. As will be more fully disclosed hereinafter, the aliquot is, following conversion to the carbide, cooled as rapidly as possible back to a temperature sufficient to minimize particle agglomeration and grain growth. Cooling back to room temperature clearly satisfies this requirement. The drop method is used as a predictor for anticipated results in the entrainment method.

The entrainment method involves the use of a vertical graphite tube reaction furnace of the type described above and disclosed in U.S. Pat. No. 5,110,565, previously incorporated by reference. The reactant powder mixtures are placed into a feed hopper, which allows flowing non-oxidizing gas, such as argon, to entrain the powdered mixture, and deliver it to the furnace's reaction chamber as a dust cloud. The powder or particulate mixture is immediately heated in the reaction chamber at rates of between about 10,000 to 100,000,000K per second, while the average residence time of powder in the furnace is on the order of seconds. As for exiting the hot zone of the reaction chamber, the flowing gas carries the powder into a water cooled stainless steel jacket which rapidly cools reacted powder below 283K. The entrainment method is the preferred method, as it has been shown to produce smaller size particulates than the drop method.

IA. Preparation of A Metallic Carbide Material

The metallic carbides of the present invention are prepared by the rapid carbothermal reduction of a reactive particulate mixture of a metal oxide source and a carbon source. The reactive mixture is preferably prepared by milling a solid source of carbon with the metal oxide. When using the two-step method, the amount of carbon should be substoichiometric in step one so the carbon content can be adjusted during step two. If, on the other hand, the metallic carbide can be made in a single step rapid carbothermal process, then the amount of carbon should be close to stoichiometric. Milling to the desired particulate size may be accomplished with the aid of any one of a number of conventional milling apparatus. Illustrative apparatus include jet mills and ball mills, the latter containing a suitable milling media such as tungsten carbide-cobalt milling media. Other physical methods for mixing the carbon and metal oxide sources, and for reducing the size of the particulates in the mixture, may also be employed.

The source of carbon is preferably a pure particulate carbon material such as carbon black, for example, in the form of acetylene black. A particularly preferred acetylene carbon black is commercially available from Chevron Chemical under the trade designation "SHAWINIGAN" (hereinafter referred to as "Chevron acetylene black"). However, it is contemplated that other solid sources would be suitable. In addition, other sources of carbon such as organic polymers, carbohydrates and hydrocarbons may be useful in place of all or part of a particulate carbon material.

In the case of WC being the desired metallic carbide, the source of tungsten oxide is preferably particulate $WO_3$ of uniform particle size, desirably on the order of $\leq 25$ μm in diameter. A preferred particulate $WO_3$ of this size is sold by GTE Products Corporation under the trade name "TO-3". Materials such as metatungstic acid, ammonium paratungstate or other tungsten oxides can be used in place of $WO_3$, while other carbonaceous solids can be used in place of the carbon black.

The heating rate for taking the reactant mixture from room temperature up to the reaction temperature is preferably at least on the order of 100 to 10,000K per second, and optimally on the order of 10,000 to 100,000,000K per second. The reaction temperature must be high enough such that the reaction is thermodynamically favorable. One way of expressing this is to say that the Gibbs free energy change for the reaction must be negative. In other words, the free energy of formation of reaction products must be less than the free energy of formation of components of the reactant mixture. It must also be less than the melting point of any intended reaction product(s). For tungsten carbide, a reaction temperature of at least 1673K is considered beneficial, while temperatures of 1823K to 2673K are preferred. When a heating rate of 10,000 to 100,000,000K per second is employed, via the entrainment method, a reaction temperature of 1873 to 2423K is satisfactory. Approximate temperatures at which free energy of formation of reaction products is less than free energy of formation of components of the reactant mixture needed to form the reaction products are as follows: tungsten carbide (WC) 950K; titanium carbide (TiC) 1555K; tantalum carbide (TaC) 1381K; vanadium carbide (VC) 932K; hafnium carbide (HfC) 1934K; niobium carbide (NbC) 1228K; zirconium carbide (ZrC) 1930K; dimolybdenum carbide ($Mo_2C$) 742K; and trichromium dicarbide ($Cr_3C_2$) 1383K.

The residence time of the reactive mixture at the reaction temperature depends in part upon the heating rate and reaction temperature, but must be high enough to reduce at least a major portion of the metallic oxide from the reactant mixture. The residence time is preferably in the range of about 0.1 second to ½ hour, depending upon the heating method, heating rate, reaction temperature, and the ultimate particle size desired. In the drop method, typical preferred residence times are from about 5 minutes to 2 hours for a reaction temperature of 1773K with a heating rate about 100 to 10,000K per second. In the entrainment method, a residence time of from about 0.2 to 10 seconds for a reaction temperature of 1823K or above with a heating rate of about 10,000 to 100,000,000K per second is preferred. At the higher heating rate, residence times substantially greater than 10 seconds may undesirably produce sintered aggregates rather than particulate product. Whatever combination of reaction temperature, residence time and heating rate is selected, however, it should be adequate to convert the reactive particulate mixture of carbon and metal oxide into a product composed mainly of metal carbide.

The three factors of reaction temperature, residence time and heating rate also control the size of the particles obtained. They do so by affecting both the nucleation rate for forming the metal carbide particles and the growth rate of these particles once formed. For example, presuming that the particles are roughly spherical in shape and the conversion of starting material to product occurs at a relatively constant volume rate, the growth rate of the particles would be proportional to the cube root of the residence time. In order to minimize the particle size of the resulting metal carbide powder, the reaction temperature, heating rate and residence time must be selected to yield a particle nucleation rate which is higher than, and preferably significantly higher than, the particle growth rate.

IB. Preparation Of Solid Solution Carbides

The solid solution metallic carbides of the present invention can be prepared by the direct rapid carbothermal reduction of a reactive particulate mixture, in a manner very similar to the method disclosed above for preparing the metal carbide. For preparing solid solution metallic carbides, however, the reactive particulate mixture is instead the mixture of a carbon source and at least one source of the oxides of at least two transition metals selected from the group consisting of tungsten, titanium, tantalum, molybdenum, zirconium, hafnium, vanadium, niobium, and chromium. The method for producing solid solution carbides is conveniently carried out by substituting the metal oxide sources for the metal oxide source employed in the method described in section IA above. This substitution is carried out with separate oxide powders of the selected metals, although a single multimetallic alloy oxide containing two or more of the metals would also be useful, but not required.

Again, the reactive particulate mixture is prepared by milling a source, preferably solid, of carbon (such as Chevron acetylene black) with particulate metal oxides in a conventional milling apparatus.

The metal oxide source preferably contains the simple oxides of the metals, such as $WO_3$, titanium dioxide ($TiO_2$) and tantalum pentoxide ($Ta_2O_5$). The oxides in the metal oxide source are preferably of uniform particle size. GTE Products Corporation's TO-3 is a preferred particulate $WO_3$. "TITANOX" from Velsicol Chemical Corporation, Chicago, Ill., is a preferred source of $TiO_2$. "TITANOX" is a trademark for Velsicol's series of white pigments comprising $TiO_2$ in both anatase and rutile crystalline forms. Some "TITANOX" series pigments are extended with calcium sulfate, but these extended pigments are not preferred for use in the present invention. A preferred source of $Ta_2O_5$ of less than 325 mesh (45 $\mu$m) size and greater than 99% purity, sold by Aldrich Chemical Company, Milwaukee, Wis. The oxides of the other metals should be of comparable purity and particle size.

Once the reactive particulate mixture is prepared, the particles are then rapidly and preferably individually heated in the same fashion as described in section IA. Considerations for the appropriate heating rate, reaction temperature and residence time are generally the same as described above in IA, and need not be repeated. Of course, the combination of reaction temperature, residence time and heating rate should be chosen so that together they are adequate to yield a solid solution metallic carbide containing at least two transition metals selected from the group consisting of tungsten, titanium, tantalum, molybdenum, zirconium, hafnium, vanadium, niobium, and chromium. The solid solution carbide should have an average particle size of $\leq$ about 1.0 $\mu$m, and preferably from about 0.01 to about 1.0 $\mu$m. The residence time should also be sufficient so that this product is predominantly the solid solution carbide.

The stoichiometry of the reactant feed mixture should be adjusted according to whether or not a second carburization step is needed. For example, in the synthesis of tungsten carbide it is difficult to directly produce pure WC using the rapid carbothermal reduction technology. As a result, the carbon stoichiometry of the reactant feed mixture should be less than theoretical to make WC ($WO_3 + 4 C = WC + 3 CO$). In comparison TiC can be made in a single step reaction and the carbon stoichiometry should be close to theoretical ($TiO_2 + 3C = TiC + 2CO$). Similarly, the synthesis of a titanium-tantalum carbide (Ti-TaC) solid solution can take place in a single step and the carbon stoichiometry should be very close to 3 moles of carbon for each mole of $TiO_2$ ($TiO_2 + 3C = TiC + 2CO$) and 7 moles of carbon for each mole of $Ta_2O_5$ ($Ta_2O_5 + 7 C = TaC + 5 CO$). The exact details of stoichiometry will depend somewhat upon the synthesis conditions and can be readily determined without undue experimentation.

II. Reactor For Forming Metallic Or Solid Solution Carbide

There are, of course, several ways to carry out heating of the particulate reactive mixture of metal oxide(s) and carbon. Most advantageously, on a mass production scale, the mixture can be entrained through the hot zone of a vertical reaction tube furnace maintained at the reaction temperature, so that the particles are separately and individually heated at the heating rate during their entry into the hot zone. For example, on a bench scale, the hot zone can be maintained in a furnace, and the heating carried out by dropping convenient aliquots of the particulate mixture into a graphite crucible in the furnace. The heating rate for particles dropped in this manner will typically be on the order of 100 to 10,000K per second.

Preferably, however, the heating process is carried out in a vertical graphite tube reaction furnace or reactor like that disclosed in commonly assigned U.S. Pat. No. 5,110,565, the relevant teachings of which are incorporated herein by reference. The reactor disclosed in U.S. Pat. No. 5,110,565 comprises four principal components of concern: a cooled reactant transport member; a reactor chamber fed by the transport member; a heating means for heating the reactor chamber; and a cooling chamber fed by the reactor chamber.

The transport member can be considered to be a conduit disposed within a preferably annular gas flow space which serves to transport the reactive particulate mixture into the reaction chamber. The transport member is suitably maintained at a temperature below the melting temperature of the metal oxide source so as to prevent the reactive particulate mixture from coalescing either within, or near the exit of, the transport member. It is believed that such coalescing defeats the purpose intended to be achieved by the prior fine milling of the particulate mixture and yields a material that is either too large in particle size or not fully converted to the precursor or solid solution carbide. Accordingly, the temperature of the transport member should be sufficient to allow substantially all of the reactive particulate mixture to enter the reactor chamber as discrete particles.

The reactive particulate mixture is suitably fed into the transport member by a powder feeding mechanism. The particular structure of the powder feeding mechanism is not particularly critical so long as it provides a metered or controlled flow of the reactive particulate mixture to the transport member. The feeding mechanism can be a single screw feeder, a twin screw feeder, a vibrator feeder, a rotary valve feeder, or some other feeder of conventional construction.

The reactor design and reactor capacity will determine the maximum acceptable particulate feed rates. For example, merely by way of illustration, for a reactor having a reaction zone volume of 2.16 cubic feet ($ft^3$) (0.06 cubic meters ($m^3$)) an acceptable feed rate is from about 0.02 to about 0.5 kilograms per minute (kgm). Acceptable feed rates for reactors having different reaction zone volumes can readily be determined without undue experimentation.

A non-oxidizing atmosphere, such as gaseous argon, is fed into the transport member at a pressure and a flow rate sufficient to entrain the reactant particulate mixture and carry the particulate mixture into the reaction chamber. The flow rate will thus determine the residence time in the reactor chamber. Preferably, the non-oxidizing gas (argon or another inert gas, optionally in admixture with one or more of hydrogen and carbon monoxide and, if desired, a non-particulate solid source of carbon) is supplied in two ways, as a major amount directly through the transport member, and as a minor amount indirectly into the reaction chamber via a gas flow space around the perimeter of the reactant transport member. If supplied by two different sources, the gas that flows through the gas flow space is desirably an inert gas such as argon. Again by way of illustration, these amounts are preferably at least 85 and 28 standard liters per minute (slm), respectively, for a reactor having a reaction zone volume of 2.16 ft$^3$ (0.06 m$^3$), but depends upon temperature and reactant feed rate. The gas flowing into the reactor chamber from the gas flow space acts to minimize or substantially eliminate contact of the reactant powder mixture with those reactor chamber surfaces near the junction with the exit of the transport member. Such contact is undesirable because these surfaces tend to be at temperatures which promote coalescence of the mixture. This can, in turn, lead to plugging of the reactor and termination of operation.

The entrained flow of reactive particulate mixture enters the reaction zone in a form approximating that of a well-dispersed dust cloud. The particles of the mixture are heated almost instantaneously by gas convective and conductive heat transfer, as well as by thermal radiation from the walls defining the heated reaction zone. For particles of a diameter less than 1000 $\mu$m, however, particle heating is dominated by gas/particle conduction/convection processes, rather than radiation. Internal particle conduction is extremely rapid compared to surface heating, so that the particles may be assumed to be isothermal with heating rates adequately described for the mass by the surface heating characteristics. It is on this basis that the preferred heating rate of about 10,000K or higher per second is calculated. The actual temperature within the reaction zone may be determined by optical pyrometry or other suitable means.

The gaseous flow of non-oxidizing gas that entrains the reactive particulate mixture and flows it into the reaction zone also carries the mixed particulate precursor out of the reaction zone. Beneficially, the entrained dust cloud exits the reaction zone and almost immediately enters a cooling zone. The cooling zone quenches or rapidly cools the mixed precursor below its reaction temperature. Cooling rates within the cooling zone beneficially approximate the heating rates within the reaction zone. The walls of the cooling zone cool the entrainment gas and rapidly remove any amount of heat retained by the mixed precursor particles. In the absence of this rapid cooling, reaction with the particles could occur for an extended time, thereby resulting in formation of undesirable agglomerates or larger grains in the product. The actual cooling time experienced will vary depending upon factors such as the particle size, the physical configuration of the cooling zone, and the exit gas flow rate.

In the preferred reactor described above, it is the demarcation between the transport member and the reaction zone that allows the preferred heating rate of 10,000 to 100,000,000K per second to be achieved. This combination of high heating rate and the short residence time at a high reaction temperature allows reaction of the particulate mixture to proceed as recited in Section IA and IB above, that is, such that the nucleation rate for the product particles is significantly higher than their growth rate. The result is that the particles are in the form of submicrometer crystals.

The cooled particles are suitably collected and processed by conventional technology. The precursor particles are beneficially greater than 0 $\mu$m to less than or equal to 1.0 $\mu$m in diameter, are typically less than or equal to 0.5 $\mu$m in diameter, preferably from 0.01 $\mu$m to less than or equal to 0.3 $\mu$m in diameter, and optimally between 0.05 and 0.2 $\mu$m in average diameter.

III. Possible Second Step Of Carburization Of A Metallic Carbide To A Highly Pure State Once the product of the present invention is collected, an extremely pure metallic carbide may be obtained by finishing off the reaction by carbothermal reduction and carburization of the original product under movement in the presence of an additional amount of solid carbon. Although the product of the first reaction may be one in which conversion is substantially complete, there may be an occasion in which very pure metallic carbide is desired. In this instance, the reaction is substantially repeated, frequently using a different apparatus, with the use of additional carbon. This additional amount of solid carbon is selected so that the oxygen, if any, in the first product (now called the "precursor" for this second reaction) is carbothermally reduced, and all of the metal present in the precursor is converted to its carbide. The amount of additional carbon is also selected to be adequate to achieve such carbothermal reduction upon heating with the original product under movement in the non-oxidizing atmosphere. The original product and the supplemental carbon can be mixed by using any one of a number of conventional mixing apparatus. Illustrative apparatus include ribbon blenders, roller mills, vertical screw mixers, V-blenders, and fluidized zone mixers, such as that sold under the trade designation "FORBERG".

By way of illustration, when the precursor is a tungsten carbide precursor, a tungsten-molybdenum carbide precursor, a tungsten-titanium carbide precursor or a tungsten-vanadium carbide precursor, heating or finishing is accomplished at a finishing temperature of from about 1473 to about 1673K. That temperature is desirably maintained for a time of from about 15 to about 180 minutes.

The additional amount of solid carbon to be added is typically determined on an empirical basis. The amount of solid carbon to be added depends upon the exact characteristics of the experimental conditions and the heating unit. This amount may be determined by those skilled in the art without undue experimentation, in view of the present disclosure. For example, in the two-step synthesis of WC under the conditions described herein, Applicants have found that an amount comprising the sum of 0.67 stoichiometric with respect to the oxygen in the precursor, and stoichiometric with respect to W$_2$C and free metal in the precursor, is just adequate to fully convert the original product to a metal carbide having low free carbon and low total oxygen. The amount of additional solid carbon to be added usually amounts to 1 to 5 wt-%, based on precursor weight, and is typically in the range of 2.15 to 2.75 wt-%.

The heating under movement of the precursor and supplemental carbon is helpful for successful conversion. Unexpectedly, and in direct contrast to treatment in a static bed, the resulting metal carbide powder is very uniform in composition and size. In the case of WC, the heating is beneficially carried out at a temperature of at least 1373K and optimally at a temperature of about 1523K, on the order of $\frac{1}{2}$ to 5 hours, depending upon the temperature and the degree of movement during heating. Temperatures and reaction times for other metallic carbides or solid solution metallic carbides can be determined by one skilled in the art without undue experimentation.

Movement of the precursor and supplemental carbon can be carried out in a variety of ways, but most preferably is carried out by disposing the mixture of them in a rotary graphite crucible, and tumbling them together by rotating the crucible while heating. For example, a crucible having a diameter of about 20 centimeters which is rotated at 1 to 10 revolutions per minute is useful for treating individual 500 gram lots of the precursor and supplemental carbon. Other apparatus suitable for imparting motion to the mixture of the precursor and supplemental carbon during heating of them include rotary calciners, fluidized beds and vibrating fluidized beds. Appropriate tumbling rates for other apparatus or for different lot sizes can be determined without undue experimentation. The heating of the precursor and supplemental carbon is carried out in an inert or non-oxidizing atmosphere, conveniently comprising argon, and preferably containing 95 mole percent argon and 5 mole percent hydrogen. The heating of the precursor and carbon can be carried out in a number of ways, for example, by induction heating of the rotary graphite crucible.

When a solid solution is formed by direct substitution (i.e., Mo for W in WC or Ti for W in WC) the lattice will shrink when the ion that is being substituted is smaller than the one it is replacing and if the concentration is sufficiently high. The lattice will expand if it is larger. In the case of Mo substituting in WC, one would expect the lattice to contract somewhat because the Mo ion is smaller than the W ion that it is replacing. As a result, the measurement of lattice parameters by high resolution x-ray diffraction techniques is a valuable tool for studying solid solution materials. These lattice parameters can be measured by a-cell and c-cell parameters, in Angstroms, to quantify the expansion or contraction of the lattice when a substitution takes place, thereby measuring the extent of a solid solution.

The following examples are directed toward the methods of the present invention. Examples 1–4 illustrate the entrainment method, and show that particle sizes of from 0.05 to 0.1 $\mu$m in diameter can be achieved. The remaining Examples 5–37 utilize the drop method, and may be used as predictors for success in the entrainment method. The drop method is a bench scale experimentation method, while the entrainment method is a production method. It has been found that the drop method produces larger sized particles of similar composition than when the exact same experiment is performed in the entrainment method. Consequently, any results which can be achieved using the drop method can be improved upon by using the entrainment method. Now that we have reviewed these considerations, let us look to the following examples.

EXAMPLE 1

A stock reactive particulate mixture of a tungsten oxide source and a carbon source useful for making a tungsten carbide precursor according to the present invention is prepared by milling 1.35 kilograms (kg) of Chevron acetylene black and 7.45 kg of GTE TO-3 $WO_3$ in a polyurethane-lined 11.4 liter (l) mill with 0.48 centimeter (cm) diameter tungsten carbide-cobalt (WC-Co) milling media. Sufficient milling media is added to fill the mill to 66% of capacity. The mixture contains 15.34 parts by weight (pbw) carbon and 84.66 pbw $WO_3$. The mill is run for 2 hours at approximately 50 rpm, then emptied, cleaned and refilled, and run for an additional 2 hours at the same speed. After the second milling, the powder is passed through a coarse (8 mesh, 2.36 mm) screen to remove the milling media. The resultant product is a uniform dispersion of carbon black and tungsten trioxide when observed through an optical microscope. The maximum size of the powder grains is about 10 $\mu$m in diameter.

Sixty six (66.0) kgs of the reactant particulate mixture of $WO_3$ and carbon prepared are loaded into the feed hopper of a vertical graphite tube reaction furnace of the type described above and disclosed in U.S. Pat. No. 5,110,565. The furnace tube is 3.35 meters (m) long and has a 15.2 centimeter (cm) inside diameter. The feed hopper is connected to the cooled reactant transport member of the furnace by a twin screw loss-in-weight feeder. The reactant transport member has an inside diameter of 1.3 cm and is maintained at a temperature of 283K by water flowing through a cooling jacket surrounding the reactant transport member. The feed hopper is purged with argon gas for 30 minutes after the reactive particulate mixture is loaded into it, while the furnace tube is brought to a temperature of 1823K as measured by optical pyrometers viewing the outside wall of the reaction chamber. Argon gas flows into the reactant transport member at a rate of 3 scfm (85.05 slm), while an additional 1 scfm (28.3 slm) of argon gas flows into the reaction chamber via the gas flow space around the perimeter of the reactant transport member.

The reactive particulate mixture of $WO_3$ and carbon is then fed from the feed hopper into the cooled reactant transport member at a rate of 0.25 pounds per minute (0.11 kg per minute) by the twin screw feeder. The flowing argon gas entrains the particulate mixture and delivers it to the reaction chamber as a dust cloud. The particulate mixture is immediately heated in the reaction chamber at a rate of approximately 10,000 to 100,000,000K per second. The average residence time of the reactive particulate mixture in the furnace is approximately 3.9 seconds, forming tungsten carbide, tungsten, and ditungsten carbide.

After exiting the hot zone of the reaction chamber, the flowing argon gas carries the product into a water cooled stainless steel jacket that rapidly cools the mixed precursor below 283K. After exiting the reactor, the product is collected in a stainless steel drum. A gas turbine meter is employed downstream of the reaction chamber in order to measure the rate of gas flow through the reactor. The flow exiting the reactor is 1.02 scfm (28.9 slm) greater than the flow of gas entering the reaction chamber. The increased gas flow arises from the carbon monoxide generated during the carbothermal reduction of the reactive particulate mixture of $WO_3$ and carbon.

An in-line sampling device located in the cooling zone is used to collect a representative sample of the product formed in the reaction chamber. The resulting product, by X-ray diffraction (XRD) analysis is composed of tungsten, ditungsten carbide ($W_2C$) and tungsten carbide. The product contains approximately 3.0 percent by weight (wt-%) oxygen and 4.74 wt-% total carbon. The average particle size of the product was observed by scanning electron microscopy to be approximately 0.1 $\mu$m in diameter.

In order to achieve pure WC, the product is subjected to a second or finishing step. Five hundred grams (500 g) of the is milled with WC milling media for 1 hour before 13.58 g of C (Chevron Acetylene Black) is added and milling continues for an additional hour. This material is placed into a rotary graphite crucible furnace similar to that previously described and subjected to a carburization reaction at 1523K for 1 hour in a 5% $H_2$ - 95% Ar atmosphere. During the carburization reaction, the 20 cm diameter crucible is rotated at approximately 6 rpm. High resolution XRD analysis of the product shows that it contains WC with no trace of $W_2C$ detected. LECO combustion analysis of the final product measured a carbon content of 6.13 wt-%. Scanning electron microscopy (SEM) showed the average particle size of the WC to be between 0.1 and 0.2 $\mu$m.

EXAMPLE 2

An 11.0 kg quantity of reactive particulate mixture, prepared as in Example 1, is fed into the vertical tube reactor described in Example 1 through its feed hopper. Except for increasing the furnace tube temperature to 2423K, the procedure of Example 1 is duplicated. The average residence time for the particulate mixture in the reaction zone is reduced to about 2.9 seconds. The downstream gas turbine meter measures an increase in exit gas flow of 0.97 scfm (27.5 slm) over the inflowing gas. XRD analysis shows the product is composed of tungsten, $W_2C$ and WC. In comparison to the product of Example 1, this product has a higher concentration of $W_2C$, a lower concentration of tungsten, and roughly the same amount of WC. Combustion analysis shows that the product of this Example contains about 0.68 wt-% oxygen and 3.885 wt-% total carbon. The product has an average particle size of 0.05 $\mu$m in diameter, as shown by SEM.

The product is finished as in Example 1 save for lowering the amount of carbon to 13.43 g. XRD analysis shows that the finished product is composed of WC with no trace of $W_2C$ detected. LECO combustion analysis of the finished product shows a carbon content of 6.18 wt-%. SEM measurements show an average WC particle size (diameter) of about 0.1 $\mu$m.

EXAMPLE 3

A 2.0 kg mixture of $WO_3$ (GTE T-03), $TiO_2$ (Titanox), and C (Chevron Acetylene Black) is prepared by taking 83.8 parts by weight (pbw) $WO_3$, 15.5 pbw C, and 0.7 pbw $TiO_2$ and milling for 4 hours with WC-Co media as in Example 1. This mixture is designed to provide a finished product with a theoretical content of 1 wt-% TiC and 99 wt-% WC. This example illustrates a W-Ti carbide solid solution made by the "entrainment" method.

Using the apparatus and procedure of Example 1, a total of 4.0 kg of the mixture is converted to an unfinished product. The average residence time in the furnace is 3.9 seconds. The downstream gas turbine meter measures an increase in gas flow of 25.2 slm (0.89 scfm). The oxygen and total carbon contents of the materials, as measured by LECO combustion analysis, are 2.7 wt-% and 4.85 wt-%, respectively. XRD analysis shows that the unfinished product is composed of tungsten, $W_2C$, and WC. The average particle diameter (SEM) is about 0.1 $\mu$m.

An amount (500 g) of this unfinished product is milled with WC-Co milling media for 1 hour after which 12.7 g of C (Chevron Acetylene Black) are added and milling continued for an additional hour. This material is then finished as in Example 1. High resolution XRD analysis of the product shows that it is composed of WC with no trace of $W_2C$ or TiC. X-ray fluorescence (XRF) shows that the finished product contains 760 ppm of Ti. Since the amount of Ti in the finished product is so small, no significant lattice parameter change can be detected as expected. It is believed, however, that the Ti is in the form of a W-Ti carbide solid solution. As anticipated, transmission electron microscopy (TEM) fails to reveal any particles of TiC. LECO combustion analysis of the finished product shows a carbon content of 6.09 wt-%. The product has an average particle diameter (SEM) of about 0.1 $\mu$m.

EXAMPLE 4

A mixture (2.0 kg lots) of $WO_3$ (GTE T-03), $MoO_3$ (Aldrich Cat #26785-6), and C (Chevron Shawinigan Acetylene Black) is prepared by taking 78.2 pbw $WO_3$, 5.9 pbw $MoO_3$, and 15.9 pbw C and milling for 4 hours with WC-Co milling media as in Example 1. This mixture is designed to provide a finished product with a theoretical content of 6 wt-% $Mo_2C$ and 94 wt-% WC. Ten kg of the mixture are reacted as in Example 1 to prepare an unfinished product that generates an increase in gas flow of 26.3 slm (0.93 scfm). The unfinished product has an average particle diameter (SEM) of less than 0.1 $\mu$m and oxygen and total carbon contents (LECO combustion analysis) of 4.067 wt-% and 5.322 wt-%, respectively.

The unfinished product is converted to a final product as in Example 1 using 38.31 g of carbon per 1000 g of unfinished product. The final product has an average particle diameter (SEM) of about 0.2 $\mu$m and oxygen and total carbon contents (LECO combustion analysis) of 0.36 wt-% and 5.58 wt-%, respectively. High resolution XRD analysis of the final product shows that it is composed primarily of a W-Mo carbide solid solution with a WC crystal structure. The a-cell parameter of the final product is 2.9062±0.0001 Angstroms (Å) (2.9062±$10^{-10}$ m) while the c-cell parameter is 2.8367±0.0004 Å (2.837×$10^{-10}$ m). These parameters compare with an a-cell parameter of 2.9055±0.0002 Å and a c-cell parameter of 2.8396±0.0004 Å for the pure WC of Example 1. These data demonstrate that the tungsten-molybdenum carbide lattice has contracted as compared with pure WC, but only in one dimension.

EXAMPLE 5

A 50 g mixture of $WO_3$ (GTE T-03), $TiO_2$ (Titanox), and C(Chevron Acetylene Black) is prepared by taking 63.50 pbw $WO_3$, 17.23 pbw $TiO_2$, and 19.27 pbw C and milling for 1 hour with WC-Co milling media. This particular mixture corresponds to the following equation: 75 wt % ($WO_3$+3.5C)+25 wt % ($TiO_2$+3C). The milling is done in a polyurethane lined 0.95 l mill filled to 66% of capacity with 0.48 cm diameter milling media. The speed of the mill is set at approximately 20 rpm. After milling, the powder is passed through a sieve as in Example 1 to remove the milling media.

Three 3 g aliquots of this mixture are dropped into a graphite crucible that is maintained at 1773K in an argon (Ar) atmosphere. By monitoring CO evolution, the reaction is believed to be essentially complete in 3 minutes for each aliquot. The CO level is allowed to reach a baseline value (no further CO evolution) before the next aliquot is dropped. It is estimated that the heating rate for each aliquot is on the order of 100 to 1000K/sec. The contents of the crucible are then milled with an additional 4 wt-% carbon and given a post reaction heat treatment at 1523K for 3 hours in Ar. XRD analysis of the heat treated product shows that it contains a high concentration of W-Ti carbide solid solution (approximately 70%), a lesser amount of WC (approximately 25%), and a trace of $W_2C$ (approximately 5%). The solid solution has a TiC/NaCl cubic crystal structure with a lattice parameter of 4.30868±/-0.00892 Å (4.309×10⁻¹⁰ m). Pure TiC has a theoretical lattice parameter of 4.3274 Å4.327×10⁻¹⁰ m). SEM analysis shows that the average product particle diameter is approximately 0.2 μm.

EXAMPLE 6

A 100 g mixture of 16.93 pbw $WO_3$, 55.15 pbw $TiO_2$, and 27.92 pbw C is prepared using the same raw materials and the same procedure as in Example 5. The mixture corresponds to the following equation: 20 wt % ($WO_3$+3.5C) +80 wt % ($TiO_2$+3C). Three 4 g aliquots of the mixture are dropped into heated graphite crucible as in Example 5 and reacted. The reaction is essentially complete, as determined by CO evolution, in about 2.5 minutes for each aliquot. XRD analysis of the product (without any finishing reaction) shows that it contains a high concentration of W-Ti carbide solid solution (approximately 87%), a lesser amount of WC (approximately 10%), and small traces of W and $W_2C$. SEM analysis shows that the average product particle diameter is approximately 0.2 μm.

EXAMPLE 7

Duplication of Example 6, save for increasing the crucible temperature to 2023K, results in an essentially complete (by CO evolution) reaction in approximately 2.0 minutes. XRD analysis of the product (without any finishing reaction) shows that it contains approximately 95% W-Ti carbide solid solution and 5% WC. There are no discernible traces of W and $W_2C$. SEM analysis shows that the average product particle diameter is approximately 0.2 μm.

EXAMPLE 8

The procedures of Example 6 are duplicated for a 100 g mixture of 42.33 pbw $WO_3$, 34.47 pbw $TiO_2$, and 23.20 pbw C. The mixture corresponds to the following equation: 50 wt % ($WO_3$+3.5C)+50 wt % ($TiO_2$+3C). As in Example 6, the reaction is essentially complete in approximately 2.5 minutes. XRD analysis of the product (without any post reaction) shows that it contains approximately 61% W-Ti carbide solid solution, 18% WC, 15% $W_2C$, and 6% W. High resolution TEM shows an average product particle diameter of about 0.15 μm.

EXAMPLE 9

When Example 8 is duplicated, except for increasing the crucible temperature to 2023K, the reaction is essentially complete in approximately 2.0 minutes. XRD analysis of the product (without any pest reaction) shows that it contains approximately 90% W-Ti carbide solid solution, 4% WC, 4% $W_2C$, and 2% W. TEM shows that the average product particle diameter (high resolution TEM) is approximately 0.2 μm.

EXAMPLE 10

Using the procedure of Example 5, a 100 g mixture of 42.33 pbw $WO_3$, 42.01 pbw $Ta_2O_5$ (Aldrich 99% pure −325 mesh (45 μm)), and 15.66 pbw C is prepared and reacted. The mixture corresponds to the following equation: 50 wt % ($WO_3$+3.5C)+3.5C)+50 wt % ($Ta_2O_5$+7C). The reaction is essentially complete in about 3 minutes. XRD analysis of the product (without any finishing reaction) shows that it contains approximately 40% W-Ta carbide solid solution, 40% $W_2C$, and 20% WC. SEM shows that the average product diameter is on the order of 0.2 μm.

EXAMPLE 11

When Example 10 is duplicated save for increasing the crucible temperature to 2023 K, the reaction is essentially complete in 2.5 minutes. XRD analysis of the product (without any finishing reaction) shows that it contains approximately 65% W-Ta carbide solid solution, 30% $W_2C$, and 5% WC. SEM shows that the average product diameter is on the order of 0.2 μm.

EXAMPLE 12

Example 10 is duplicated for a 100 g mixture of 34.47 pbw $TiO_2$, 42.01 pbw $Ta_2O_5$, and 23.52 pbw C. The mixture corresponds to the following equation: 50 wt % ($TiO_2$+3C)+50 wt % ($Ta_2O_5$+7C). The reaction is found to be essentially complete (by CO evolution) in approximately 4.5 minutes. XRD analysis of the product (without any post reaction) shows that it contain 100% of the Ti-Ta carbide solid solution, with no other phases detected. SEM shows that the average product diameter is on the order of 0.2 μm.

EXAMPLE 13

When Example 12 is duplicated save for increasing the crucible temperature to 2023K, the reaction is essentially complete in 2 minutes. The product is essentially identical to that produced in Example 12.

EXAMPLE 14

Example 10 is duplicated with a 100 g mixture of 42.23 pbw $WO_3$, 21.01 pbw $Ta_2O_5$, 17.24 $TiO_2$ and 19.42 pbw C. This particular mixture corresponds to the following equation: 50 wt-% ($WO_3$+3.5C)+25 wt-% ($Ta_2O_5$+7C)+25 wt-% ($TiO_2$+3C). The reaction is essentially complete in approximately 3 minutes. XRD analysis of the product (without any finishing reaction) shows that it contains approximately 75% W-Ti-Ta carbide solid solution, 15% $W_2C$, and 10% W. SEM shows that the average product diameter is on the order of 0.2 μm.

EXAMPLE 15

Duplication of Example 14 except for increasing the crucible temperature to 2023K provides a complete reaction in approximately 2.5 minutes. XRD analysis of the product (without any finishing reaction) shows that it contains approximately 90% W-Ti-Ta carbide solid solution, 5% $W_2C$, and 5% W. SEM shows that the average product diameter is on the order of 0.2 μm.

EXAMPLES 16-37

The following Group IVB (Ti, Zr, Hf), Group V B (V, Nb, Ta), and Group VIB (Cr, Mo, W) metal oxides are converted to their corresponding metallic carbides or solid solution metallic carbides by replicating the procedure of Example 5, except for reducing the milling time to 30 minutes, for 100 g quantities of reactant mixtures. Reactants used in preparing the mixtures are shown in Table 1. Table 2 shows reactant mixture composition and crucible temperature. Table 3 shows the reaction time, product phase chemistry and particle size in μm.

TABLE 1

Raw Materials Used in Examples 16 Through 37

| Material | Source | Purity (%) | Grade |
|---|---|---|---|
| C Black | Chevron | n.d. | Shawinigan |
| $MoO_3$ | Aldrich | 99.5 | 26,785-6 |
| $TiO_2$ | Aldrich | 99+ | 24,857-6 |
| $Ta_2O_5$ | Aldrich | 99 | 30,351-8 |
| $HfO_2$ | Aldrich | 98 | 20,211-8 |
| $ZrO_2$ | Aesar | 99+ | 11395 |
| $WO_3$ | GTE | 99.9 | TO-3 |

The data presented in Table 3 show that satisfactory products can be made using the drop method. Based upon a comparison of Examples 1 and 16, it is believed that substantially similar results can be obtained by replicating the drop method experiments using the entrainment method. The entrainment method does, however, typically yield a product with a much smaller particle size than that produced by the drop method. By way of illustration, Example 1 yields an average particle size of between 0.1 and 0.2 μm at 1823K and Example 2 results in an average particle size of about 0.1 μm at 2423K whereas Example 16 yields an average particle size of 0.5 μm at 2023K. Similar results are expected for the other products when they are made by the entrainment method.

TABLE 2

Reactant Feed Mixture and Reaction Temperatures Used for Examples 16 Through 37

| Example | Reactant Mixture (wt-%) | Temperature (K) |
|---|---|---|
| 16 | $WO_3 + 4C$ | 2023 |
| 17 | $WO_3 + 4C$ | 2223 |
| 18 | $TiO_2 + 3C$ | 1823 |
| 19 | $TiO_2 + 3C$ | 2023 |
| 20 | $TiO_2 + 3C$ | 2223 |
| 21 | $ZrO_2 + 3C$ | 2223 |
| 22 | $Ta_2O_5 + 7C$ | 2023 |
| 23 | $Ta_2O_5 + 7C$ | 2223 |
| 24 | $2MoO_3 + 7C$ | 2223 |
| 25 | $50\%(TiO_2 + 3C) + 50\%(HfO_2 + 3C)$ | 1823 |
| 26 | $50\%(TiO_2 + 3C) + 50\%(HfO_2 + 3C)$ | 2023 |
| 27 | $50\%(TiO_2 + 3C) + 50\%(HfO_2 + 3C)$ | 2223 |
| 28 | $50\%(2MoO_3 + 7C) + 50\%(Ta_2O_5 + 7C)$ | 1823 |
| 29 | $50\%(2MoO_3 + 7C) + 50\%(Ta_2O_5 + 7C)$ | 2023 |
| 30 | $50\%(2MoO_3 + 7C) + 50\%(Ta_2O_5 + 7C)$ | 2223 |
| 31 | $50\%(Ta_2O_5 + 7C) + 50\%(WO_3 + 4C)$ | 2023 |
| 32 | $50\%(Ta_2O_5 + 7C) + 50\%(WO_3 + 4C)$ | 2223 |
| 33 | $50\%(HfO_2 + 3C) + 50\%(Ta_2O_5 + 7C)$ | 1823 |
| 34 | $50\%(HfO_2 + 3C) + 50\%(Ta_2O_5 + 7C)$ | 2023 |
| 35 | $50\%(HfO_2 + 3C) + 50\%(Ta_2O_5 + 7C)$ | 2223 |
| 36 | $33.3\%(TiO_2 + 3C) + 33.3\%(HfO_2 + 3C) + 33.3\%(Ta_2O_5 + 7C)$ | 2023 |
| 37 | $33.3\%(TiO_2 + 3C) + 33.3\%(HfO_2 + 3C) + 33.3\%(Ta_2O_5 + 7C)$ | 2223 |

TABLE 3

Reaction Time, Phase Chemistry, and Particle Size Results for Examples 16 Through 37

| Example | Reaction Time (minutes) | Phases Present (M = major, m = minor, t = trace) | Particle Size (μm) |
|---|---|---|---|
| 16 | 2.75 | $W_2C$ = M, WC = m, W = m | 0.5 |
| 17 | 2.25 | $W_2C$ = M, WC = m, W = m | 0.5 |
| 18 | 2.50 | TiC = M | 0.4 |
| 19 | 2.00 | TiC = M | 0.4 |
| 20 | 2.75 | TiC = M | 0.4 |
| 21 | 2.75 | ZrC = M | 0.4 |
| 22 | 3.00 | TaC = M, $Ta_2C$ = t | 0.3 |
| 23 | 2.50 | TaC = M | 0.3 |
| 24 | 3.00 | $Mo_2C$ = M | 0.4 |
| 25 | 2.50 | Ti(Hf)C = M, Hf(Ti)C = M | 0.3 |
| 26 | 2.50 | Ti(Hf)C = M, Hf(Ti)C = M | 0.3 |
| 27 | 2.00 | Hf(Ti)C = M, Ti(Hf)C = M | 0.4 |
| 28 | 3.00 | Ta(Mo)C = M, $Mo_2C$ = t | 0.5 |
| 29 | 3.00 | Ta(Mo)C = M, $Mo_2C$ = t | 0.5 |
| 30 | 2.75 | Ta(Mo)C = M, $Mo_2C$ = t | 0.4 |
| 31 | 3.00 | WC = M, Ta(W)C = M, $W_2C$ = m | 0.5 |
| 32 | 2.75 | Ta(W)C = M, WC = M | 0.4 |
| 33 | 3.25 | TaC = M, HfC = M | 0.4 |
| 34 | 3.00 | Ta(Hf)C = M, Hf(Ta)C = M | 0.4 |
| 35 | 3.25 | Ta(Hf)C = M, Hf(Ta)C = M | 0.5 |
| 36 | 2.50 | Ti(Ta,Hf)C = M, Hf(Ti,Ta)C = M | 0.4 |
| 37 | 2.50 | Ti(Ta,Hf)C = M, Hf(Ti,Ta)C = m | 0.3 |

What is claimed is:

1. A method for making a particulate ceramic composition, consisting essentially of:
  rapidly carbothermally reducing a reactive particulate mixture of (a) at least one metallic oxide selected from the group consisting of the oxides of the Group IVB (Ti, Zr, Hf), Group VB (V, Nb, Ta); Group VIB (Cr, Mo, W) transition metals, and combinations thereof and (b) a carbon source by heating the reactive particulate mixture at a rate of between about 100K/sec to about 100,000,000K/sec in a substantially non-oxidizing atmosphere to an elevated temperature that makes carbothermal reduction of the reactive particulate mixture thermodynamically favorable; and
  holding the particulate mixture at the elevated temperature for a residence time sufficient to substantially convert said reactive particulate mixture into at least one product selected from the group consisting of (i) one or more metallic carbides, (ii) one or more metallic carbide precursors, (iii) one or more solid solution carbides, and (iv) one or more solid solution metallic carbide precursors, and combinations thereof.

2. The method of claim 1, wherein said product is a tungsten carbide precursor and the elevated temperature is within a range of from 1673K to 2673K.

3. The method of claim 1, wherein said residence time is from about 0.1 second to 30 minutes.

4. The method of claim 1, wherein said residence time is from about 0.1 second to 5 minutes.

5. The method of claim 1, wherein said residence time is from about 0.1 second to 30 seconds.

6. The method of claim 1, wherein said residence time is from about 0.1 second to 10 seconds.

7. The method of claim 1, wherein said heating rate is in the range of from about $10^2$ to $10^8$K/second.

8. The method of claim 1, wherein said heating rate is in the range of from about $10^3$ to $10^6$K/second.

9. The method of claim 1, wherein said heating rate is in the range of from about $10^4$ to $10^5$K/second.

10. The method of claim 1, wherein said product is at least one metallic carbide selected from the group consisting of titanium carbide, zirconium carbide, hafnium carbide, tantalum carbide, and molybdenum carbide.

11. The method of claim 1, wherein said product is a tungsten carbide precursor that has a size of from about 0.01 to 0.2 micrometer and is capable of being further converted to substantially pure tungsten carbide.

12. The method of claim 1, wherein said product is at least one solid solution carbide selected from the group consisting of tungsten-titanium carbide, molybdenum-tantalum carbide, titanium-tantalum carbide, tungsten-titanium-tantalum carbide, hafnium-tantalum carbide, titanium-hafnium carbide, tantalum-tungsten carbide, and titanium-tantalum-hafnium carbide.

13. The method of claim 1, wherein said product is at least one solid solution metallic carbide precursor selected from the group consisting of tungsten-molybdenum carbide and tungsten-vanadium carbide.

14. The method of claim 1, wherein said step of preparing a reactive precursor is accomplished by milling the metallic oxide(s) and the carbon source with WC-Co media.

15. The method of claim 1, wherein said carbon source includes carbon black.

16. The method of claim 15, wherein the carbon black is acetylene carbon black.

17. The method of claim 1, wherein the product is a precursor selected from (ii) or (iv) and the precursor is subjected to a finishing step in which an amount of carbon sufficient to convert the precursor to a finished product is admixed with the precursor to form a mixture that is then heated to a finishing temperature and maintained at that temperature for a period of time sufficient to convert the precursor to a finished product.

18. The method of claim 17, wherein the precursor is a tungsten carbide precursor, a tungsten-molybdenum carbide precursor, a tungsten-titanium carbide precursor or a tungsten-vanadium carbide precursor and the finishing temperature is from about 1473 to about 1673K and the time at the finishing temperature is from about 15 to about 180 minutes.

19. The method of claim 17, wherein the mixture is subjected to a mixing action during finishing.

20. A solid solution metallic carbide, comprising at least two different metallic components, wherein the solid solution metallic carbide has a mean particle diameter between about 0.01 micrometer and about 1.0 micrometer, the two different metallic components being selected from the group consisting of Group IVB (Ti, Zr, Hf), Group VB (V, Nb, Ta), and Group VIB (Cr, Mo, W) transition metals, and combinations thereof.

21. The solid solution metallic carbide of claim 20, wherein one of the two metallic components serves as a grain growth inhibitor and is present in an amount that is greater than 0 wt-% but less than 10 wt-%, the other metallic component is present in an amount that is greater than 90 wt-% but less than 100 wt-%, and the grain growth inhibitor is intimately admixed with the other metallic component.

22. A particulate metallic carbide having a mean as synthesized particle diameter that is between 0.01 micrometer and 0.3 micrometer and a metallic component that is selected from the group consisting of Ti, Zr, Hf, V, Nb, Ta, Cr, Mo and W.

23. The metallic carbide of claim 22, wherein the metallic carbide is tungsten carbide and the mean as synthesized particle diameter that is between 0.01 micrometer and 0.2 micrometer.

* * * * *

UNITED STATES PATENT AND TRADEMARK OFFICE
CERTIFICATE OF CORRECTION

PATENT NO. : 5,380,688
DATED : January 10, 1995
INVENTOR(S) : Stephen D. Dunmead, et. al.

It is certified that error appears in the above-indentified patent and that said Letters Patent is hereby corrected as shown below:

Title page, item [75], Inventors:   --Edward E. Timm should be added--.

Signed and Sealed this

Twelfth Day of March, 1996

Attest:

BRUCE LEHMAN

*Attesting Officer*       *Commissioner of Patents and Trademarks*